March 6, 1945.　　C. O. MARSHALL ET AL　　2,370,982
WEIGHING SCALE
Filed Jan. 7, 1942　　10 Sheets-Sheet 1
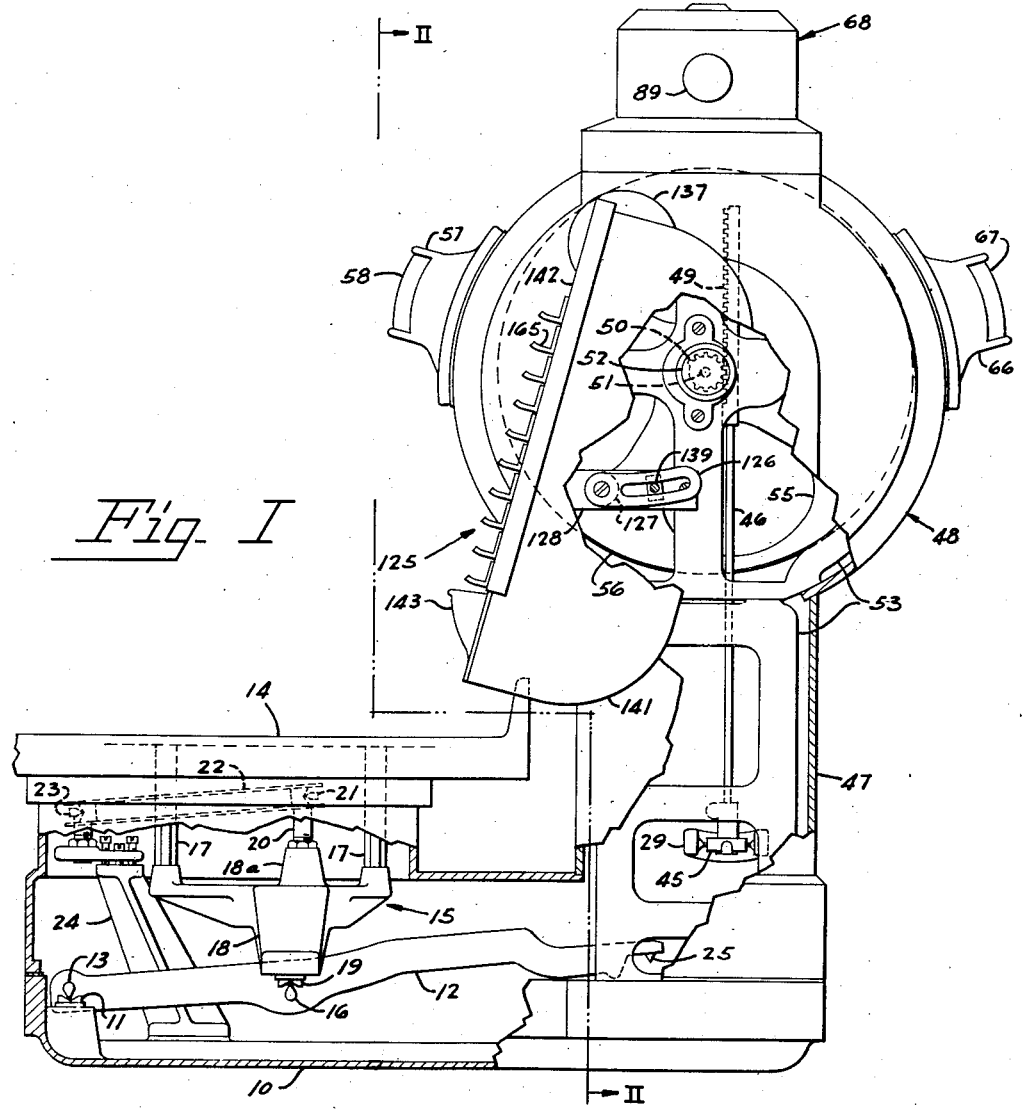
Fig. I
CHARLES O. MARSHALL
LAWRENCE S. WILLIAMS
INVENTORS
BY Marshall & Marshall
ATTORNEYS

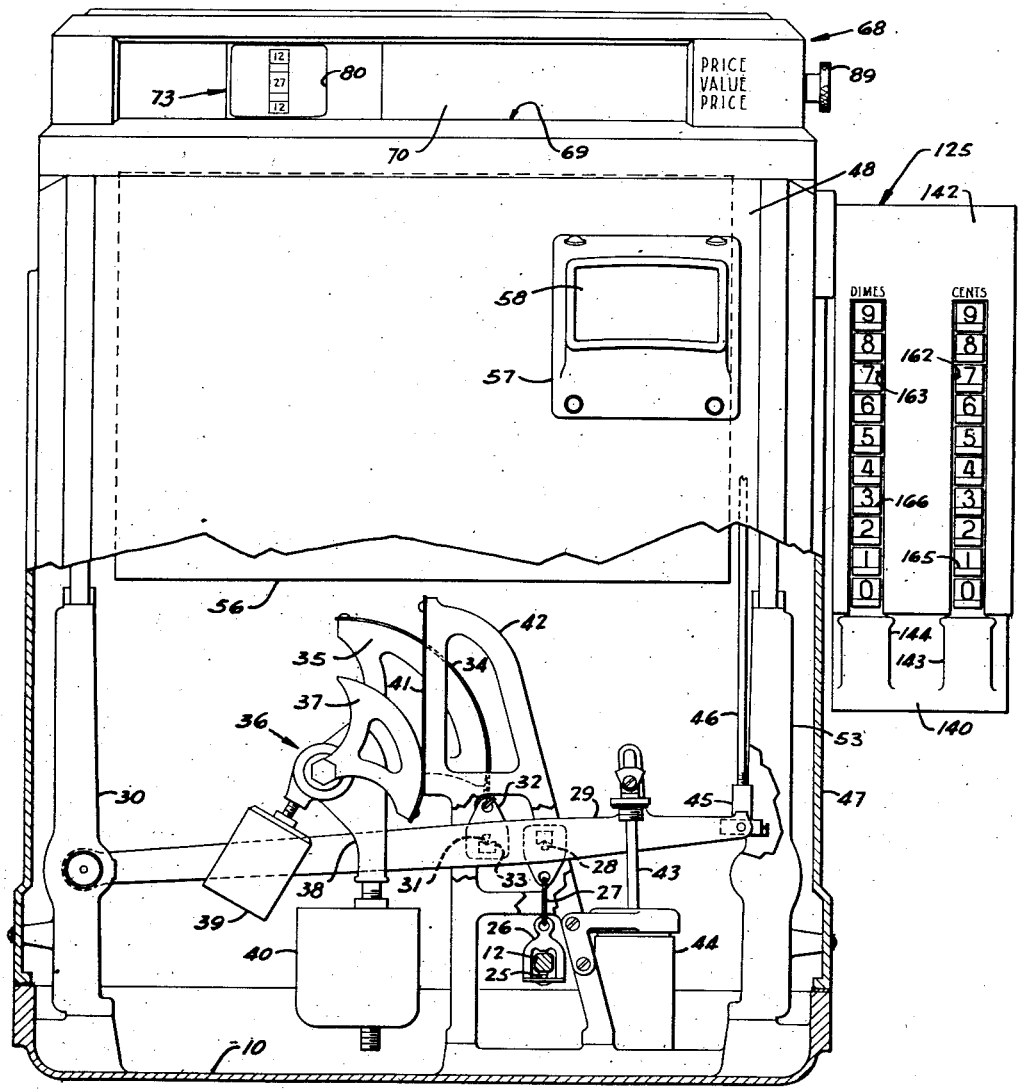
Fig. II
CHARLES O. MARSHALL
LAWRENCE S. WILLIAMS
INVENTORS

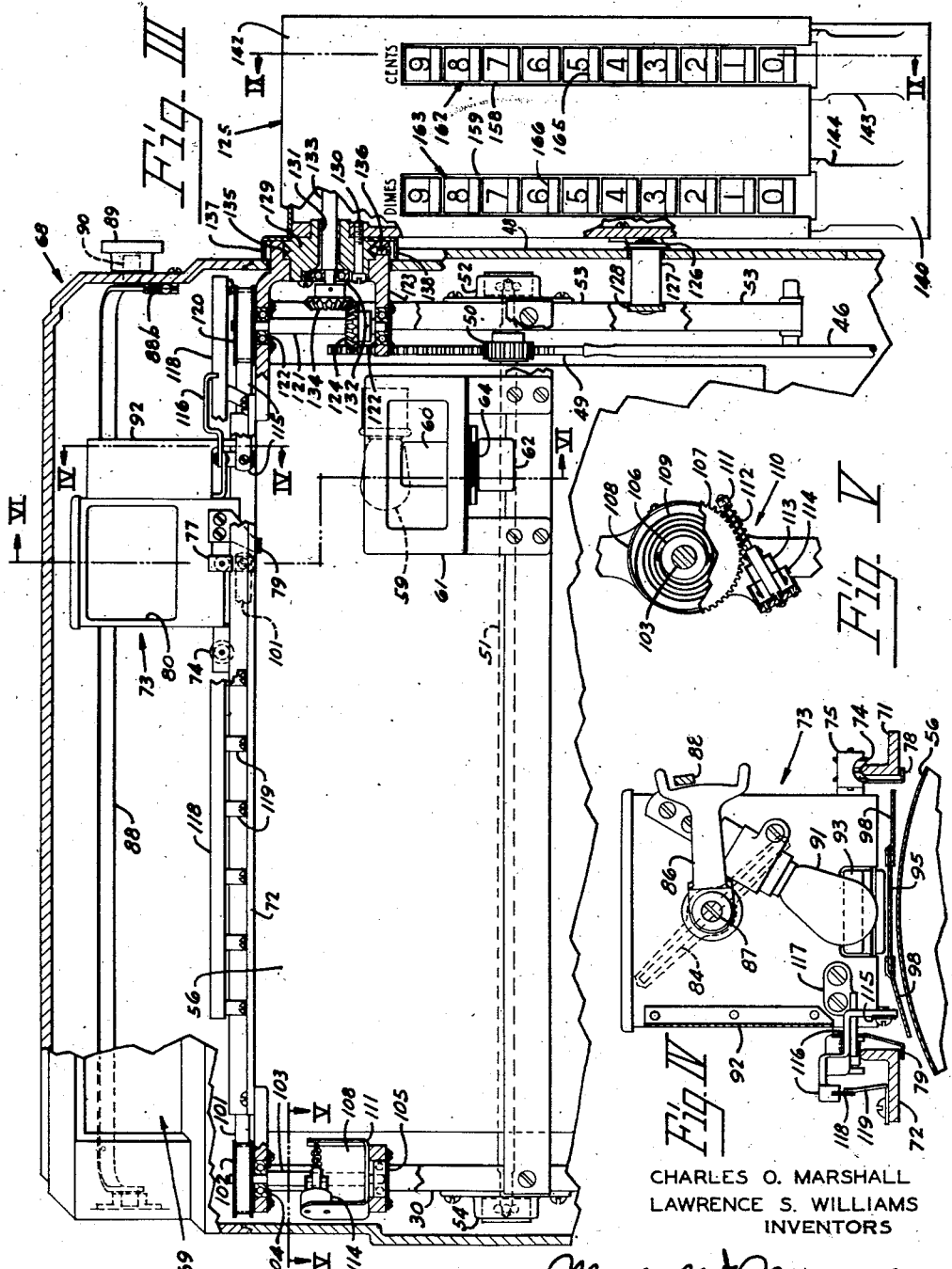

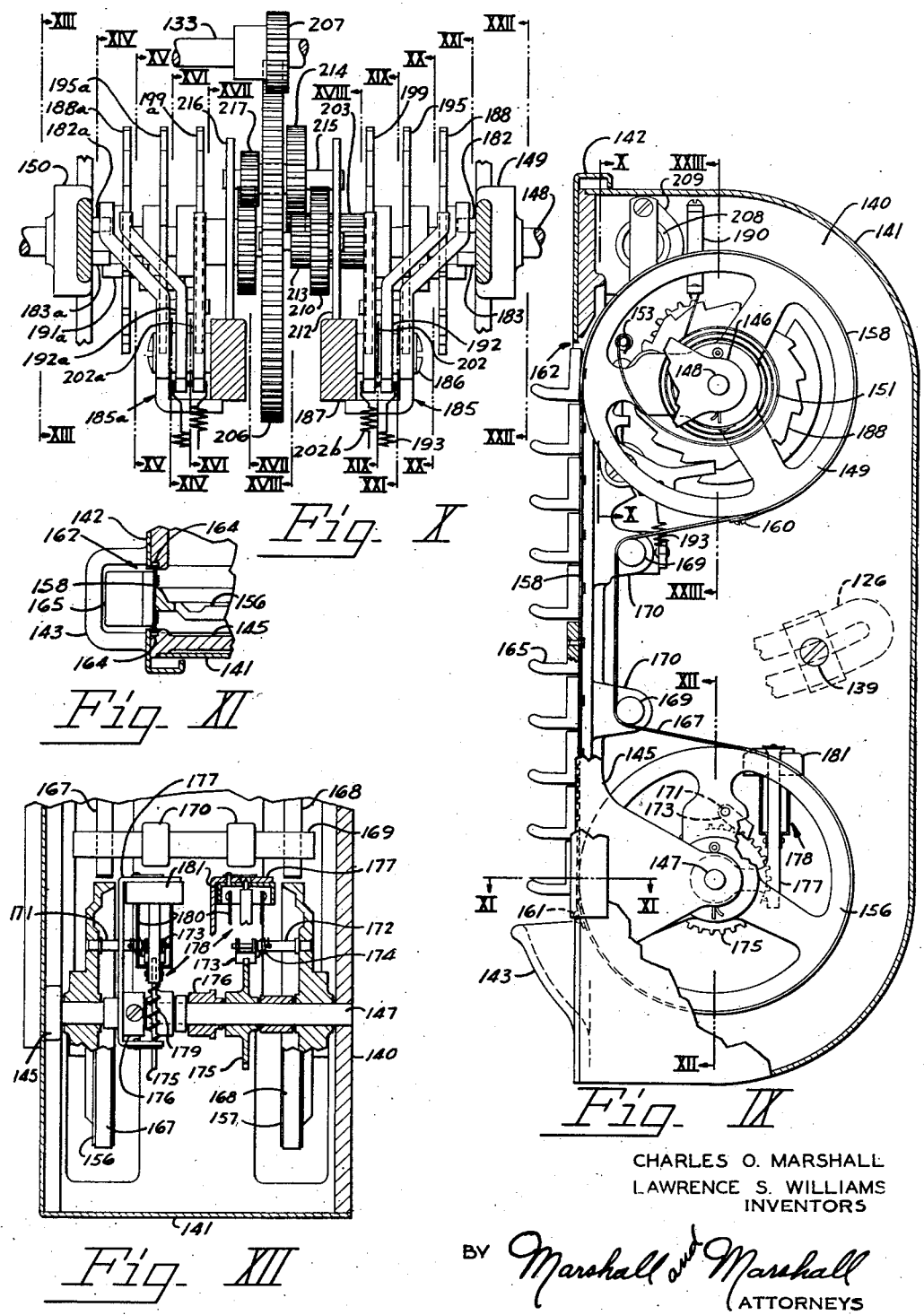

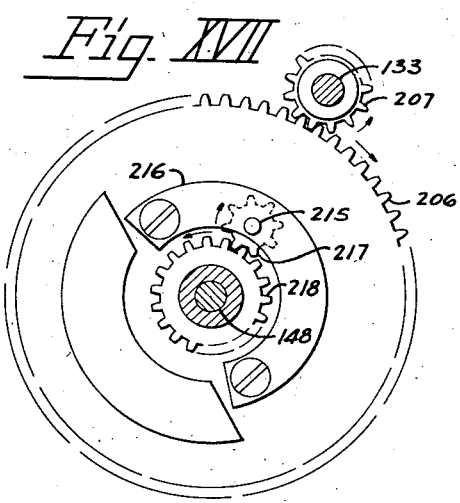
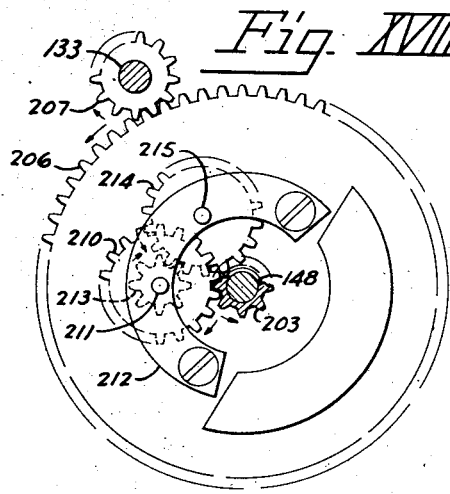
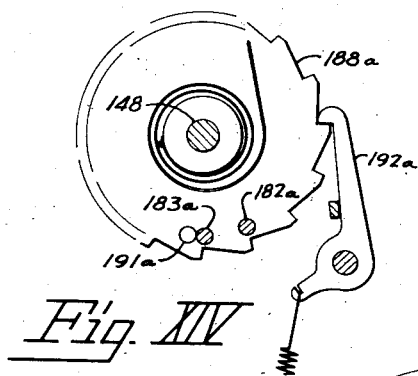
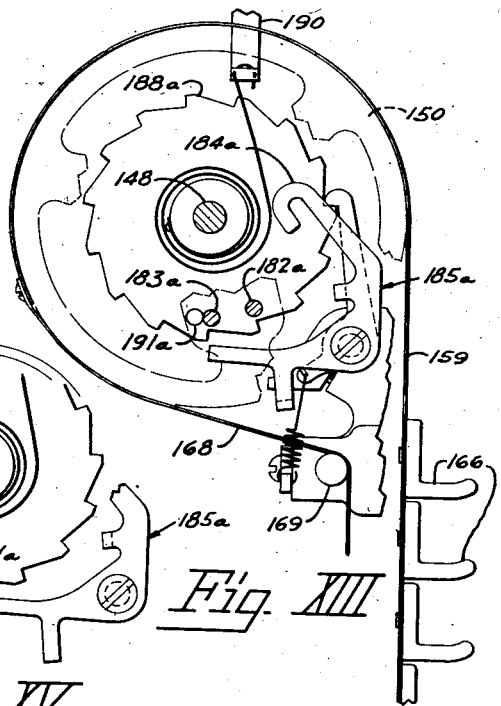
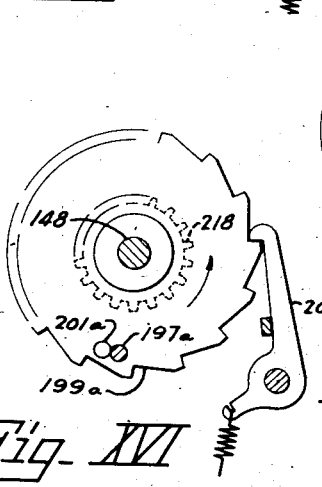
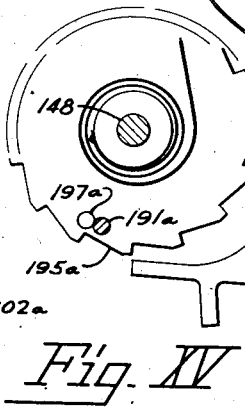
CHARLES O. MARSHALL
LAWRENCE S. WILLIAMS
INVENTORS March 6, 1945. C. O. MARSHALL ET AL 2,370,982
WEIGHING SCALE
Filed Jan. 7, 1942 10 Sheets-Sheet 7
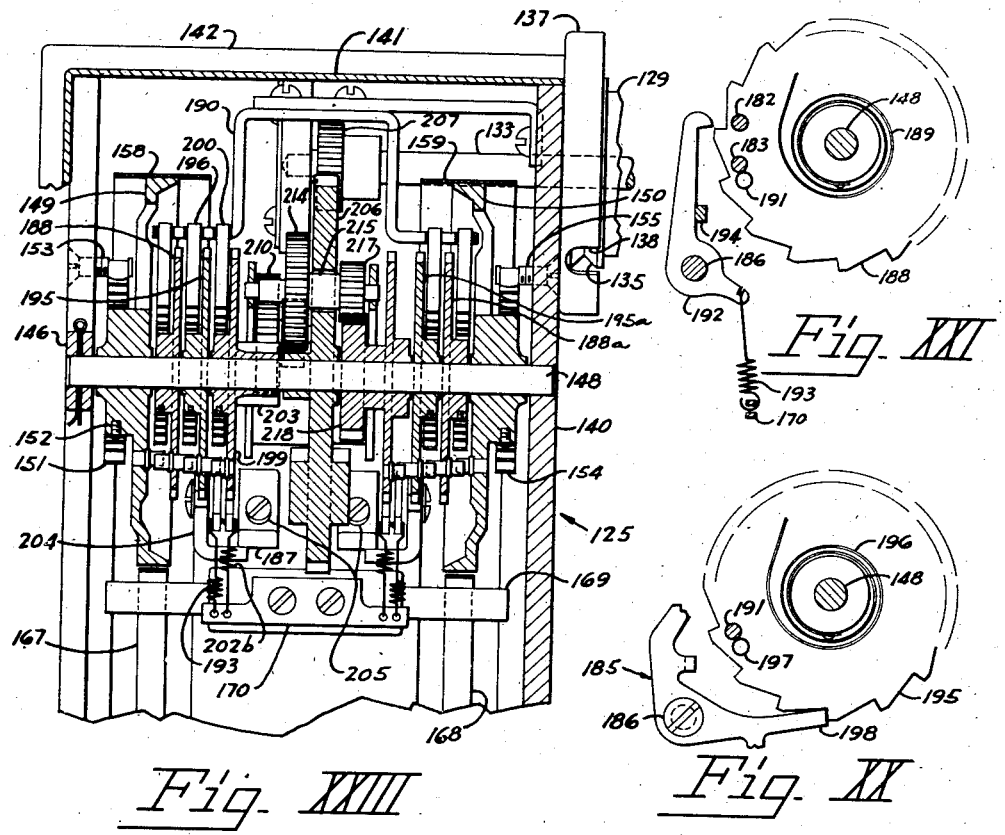
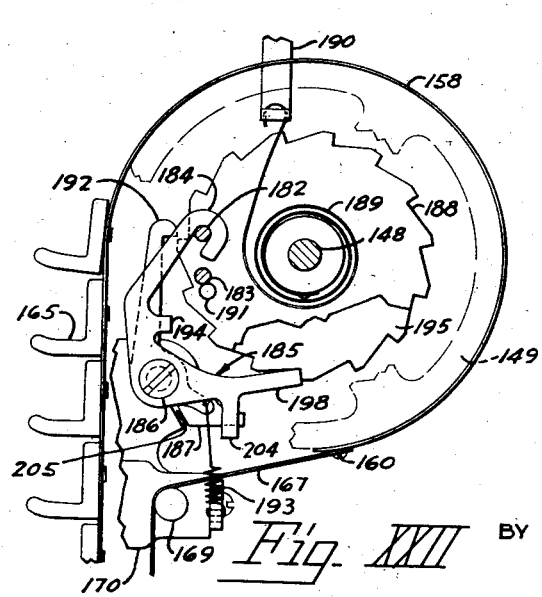
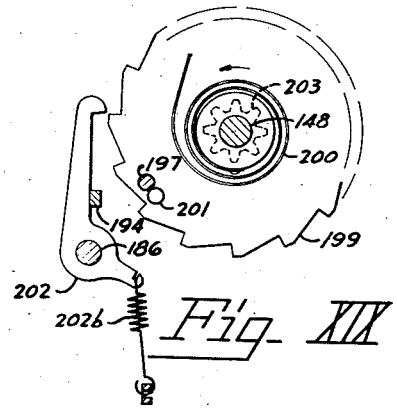
CHARLES O. MARSHALL
LAWRENCE S. WILLIAMS
INVENTORS
BY Marshall and Marshall
ATTORNEYS

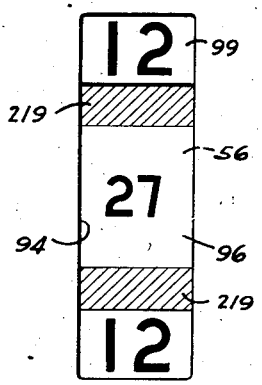
*Fig. XXV*
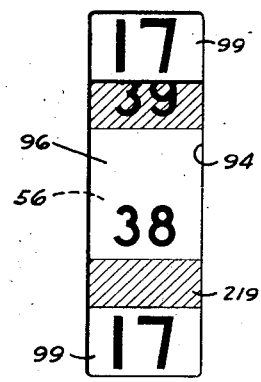
*Fig. XXVI*
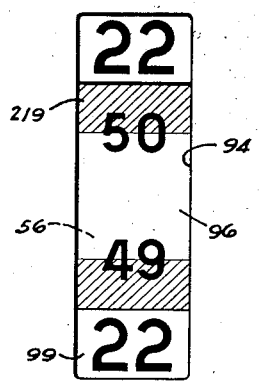
*Fig. XXVII*
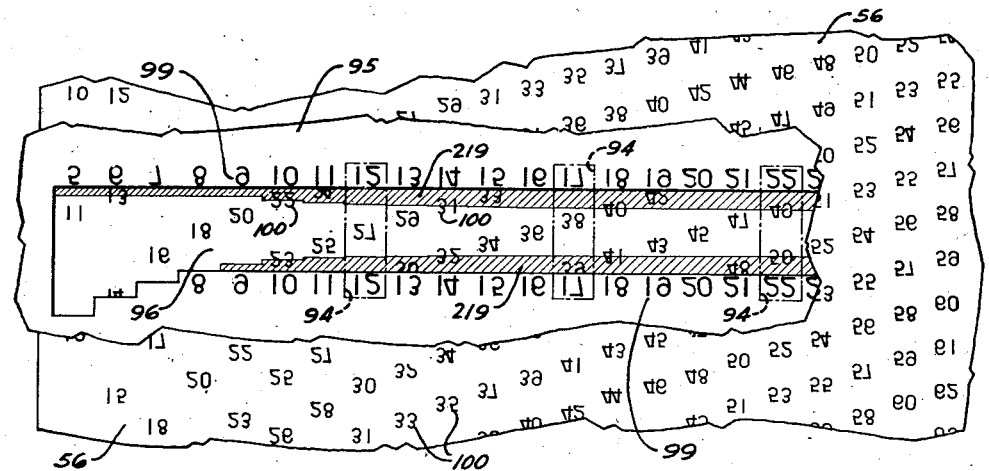
*Fig. XXIV*
CHARLES O. MARSHALL
LAWRENCE S. WILLIAMS
INVENTORS
BY Marshall and Marshall
ATTORNEYS

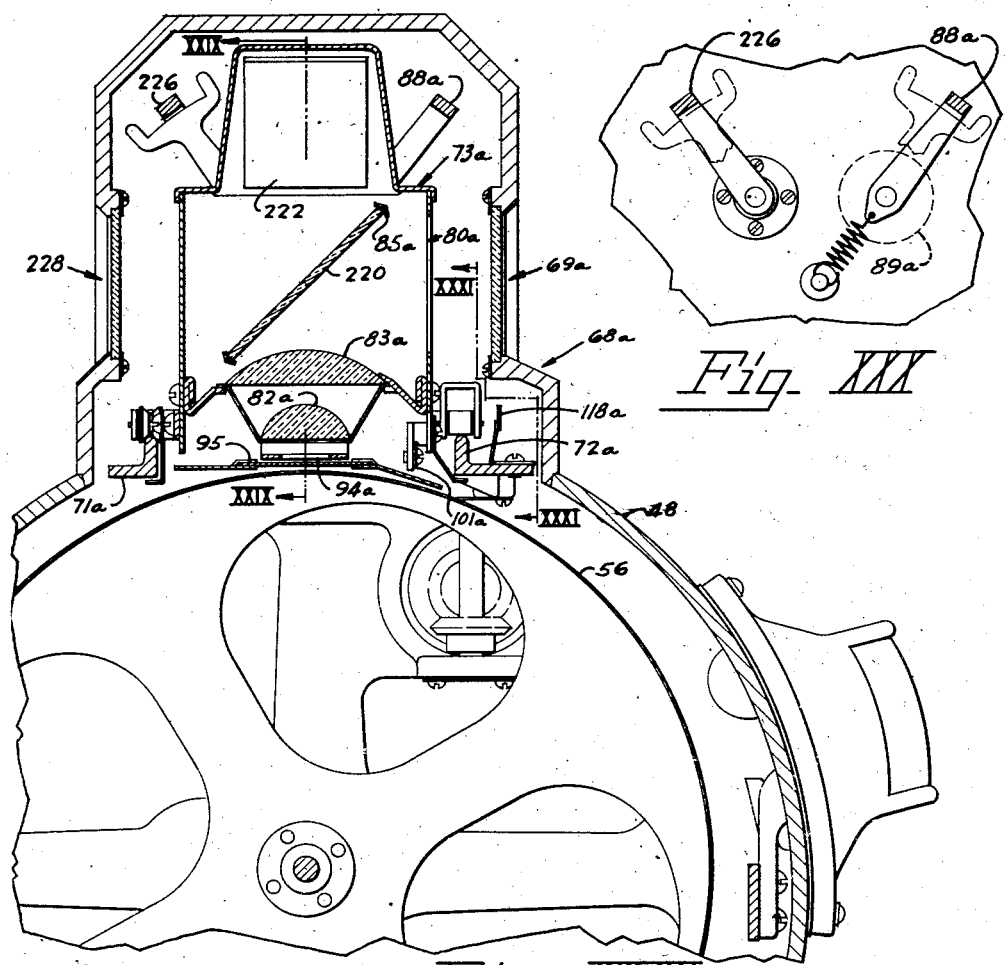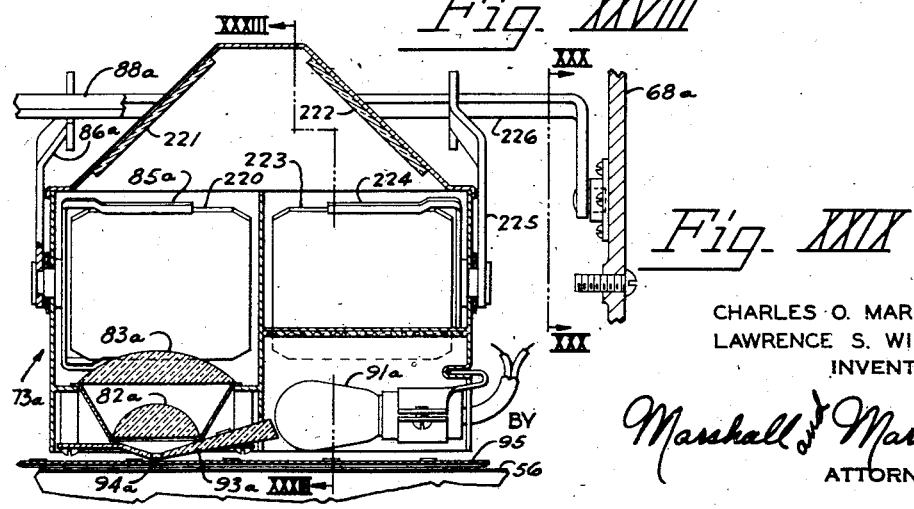

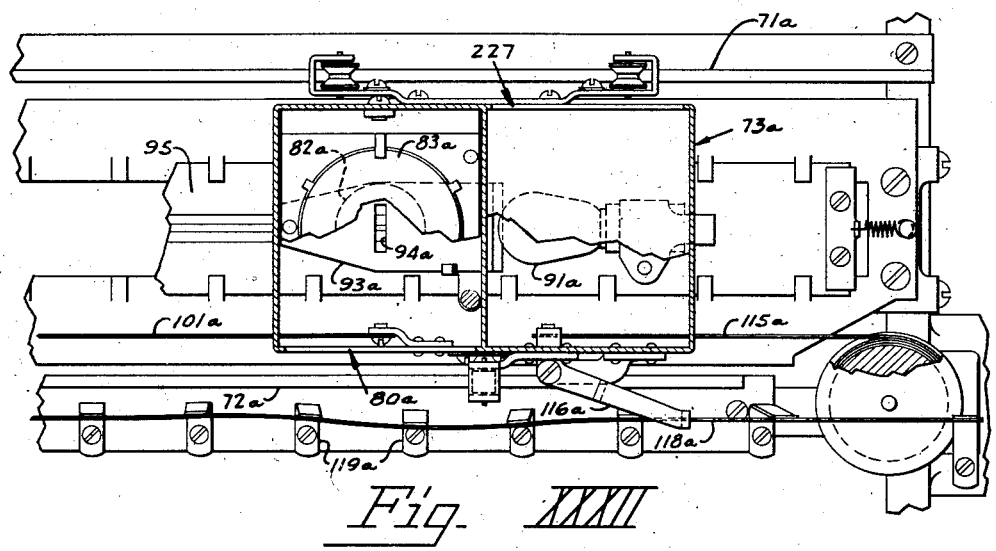
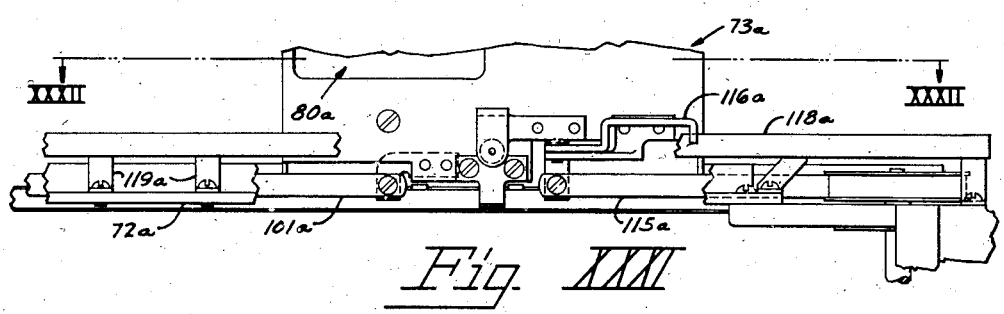
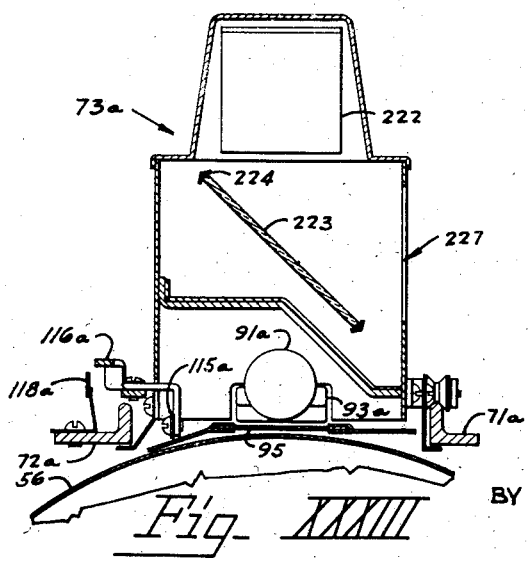

Patented Mar. 6, 1945

2,370,982

UNITED STATES PATENT OFFICE 2,370,982

WEIGHING SCALE

Charles O. Marshall and Lawrence S. Williams, Toledo, Ohio, assignors to Toledo Scale Company, Toledo, Ohio, a corporation of New Jersey Application January 7, 1942, Serial No. 425,810

17 Claims. (Cl. 265—29)

This invention relates to weighing scales of the computing type and, more particularly, to weighing scales of this type which indicate only one price and amount for the merchandise being weighed on the scale.

The usual computing scale has a chart having parallel peripheral rows of computed money amounts and a price indicia bearing member associated with the chart. In pricing the merchandise being weighed on the scale, the clerk must first look along the price indicia member to find the price per pound of the merchandise and then look at the row of figures on the chart which are associated with the price indicia and read the amount.

This method has several disadvantages among which are the possibility of error in transferring from the price indicia to the amount indicia, errors due to lack of familiarity with the chart and errors due to reading the wrong one of several figures in the same row of amount indicia which are visible on the chart above the price indicia member. (This last is particularly prevalent when the price per pound is high and the amount indicia are close together.)

It would be desirable to afford amount indication to the customer as well as to the merchant, but scales giving customer indications of amount using this type of computing chart have been found less than satisfactory because, in the first place, most customers cannot read them and may enter into arguments with the clerk which necessitates a complete explanation by the clerk of how the chart is to be used and secondly, two sets of amount indicia must be located on the chart which not only limits the capacity of the scale but also is another source of error due to the difficulty of constructing the two sets of amount indicia exactly alike.

Scales have been designed which provide means for exhibiting only one price and amount at a time to the merchant. However, they usually have had means which were movable along the price indicia and which were positioned to exhibit the correct price indicia by hand and by eye. Such means do not lend themselves to rapid or accurate operation because the positioning is still dependent upon the human element.

It is an object of this invention to provide a computing scale which will exhibit only one price and associated amount indicia corresponding thereto.

It is another object of this invention to provide a single price exhibiting computing scale which is operated by a keyboard having means for "setting up" the correct price per pound of the merchandise being weighed.

It is still another object of this invention to provide a large brightly illuminated indication of only the price per pound and money amount of the merchandise being heighed on the scale and of no other prices per pound or amounts.

It is a further object of this invention to provide a key set mechanism which will move a viewing device from one position to another in either direction from the first position, without having to return such viewing device to a certain starting place before reading the second position.

It is a still further object of this invention to provide a price per pound and amount indication for the customer which will show only the particular price of the merchandise being weighed and the total value thereof.

More specific objects and advantages are apparent from the description, in which reference is had to the accompanying drawings illustrating a preferred form of scale embodying the invention.

In the drawings:

Fig. I is an end view in elevation of a weighing scale embodying the invention, certain parts being broken away to show some details of the weighing mechanism.

Fig. II is a view, partly in section and partly in elevation, taken substantially from the position indicated by the line II—II of Fig. I.

Fig. III is an enlarged fragmentary view, partly in section, of a portion of the price selecting and indicating mechanism of the scale illustrated in Fig. I.

Fig. IV is a further enlarged fragmentary vertical sectional view, taken substantially on the line IV—IV of Fig. III.

Fig. V is a fragmentary view on an enlarged scale, taken on the line V—V of Fig. III.

Fig. VI is a fragmentary vertical sectional view, taken substantially on the line VI—VI of Fig. III.

Fig. VII is a fragmentary vertical sectional view taken substantially on the line VII—VII of Fig. VI.

Fig. VIII is a fragmentary sectional view, taken substantially from the position as shown by the line VIII—VIII of Fig. VII.

Fig. IX is a view on an enlarged scale, showing price selecting mechanism, the casing therefore being partly broken away and partly shown in section, from the position indicated by the line IX—IX of Fig. III.

Fig. X shows, on an enlarged scale, parts of the price selecting mechanism as viewed from the position indicated by the line X—X of Fig. IX, the parts being somewhat spread horizontally and portions of the framework being shown in section.

Fig. XI is a fragmentary sectional view, taken on the line XI—XI of Fig. IX.

Fig. XII is a vertical fragmentary sectional view, taken substantially on the line XII—XII of Fig. IX.

Fig. XIII is a fragmentary view of a portion of the selecting mechanism, taken substantially from the position indicated by the line XIII—XIII of Fig. X.

Fig. XIV is a fragmentary view, taken substantially on the line XIV—XIV of Fig. X.

Fig. XV is a view similar to Fig. XIV but taken from the position shown by the line XV—XV of Fig. X.

Fig. XVI is another view similar to Fig. XIV but taken from the position shown by the line XVI—XVI of Fig. X.

Fig. XVII is a detailed view of gearing mechanism, taken from the position shown by the line XVII—XVII of Fig. X.

Fig. XVIII is a view similar to Fig. XVII but taken from the position shown by the line XVIII—XVIII of Fig. X.

Fig. X is a detailed view, taken from the line XIX—XIX of Fig. X.

Fig. XX is a view similar to Fig. XIX, taken from the line XX—XX of Fig. X.

Fig. XXI is a similar view, taken from the line XXI—XXI of Fig. X.

Fig. XXII is a view similar to Fig. XIII but taken from the position indicated by the line XXII—XXII of Fig. X.

Fig. XXIII is an enlarged fragmentary vertical sectional view, taken substantially on the line XXIII—XXIII of Fig. IX.

Fig. XXIV is a fragmentary detailed enlarged view of the indicating means of the weighing scale illustrated in Fig. I.

Figures XXV, XXVI and XXVII are enlarged views of portions of the indicating means shown in Fig. XXIV as they would appear with a certain load being weighed on the scale.

Fig. XXVIII is a view similar to Fig. VI but of a modification of a portion of the mechanism.

Fig. XXIX is a fragmentary vertical sectional view, taken substantially on the line XXIX—XXIX of Fig. XXVIII.

Fig. XXX is a fragmentary sectional view, taken substantially from the position indicated by the line XXX—XXX of Fig. XXIX.

Fig. XXXI is a fragmentary view in elevation, taken substantially on the line XXXI—XXXI of Fig. XXVIII.

Fig. XXXII is a fragmentary view, partly in plan and partly in section, taken substantially from the position indicated by the line XXXII—XXXII of Fig. XXXI.

Fig. XXXIII is a fragmentary vertical sectional view, taken substantially on the line XXXIII—XXXIII of Fig. XXIX.

These specific drawings and the specific description that follows merely disclose and illustrate the invention and are not intended to impose limitations upon the claims.

A main base 10 has bearings 11 mounted in bosses near its front end. A main lever 12 is mounted by fulcrum pivots 13 in the bearings 11 and extends substantially horizontally over the base 10 towards the rear part of the base. A load receiving platter 14 is supported on a platter spider 15 which is pivotally mounted upon load pivots 16 of the lever 12. The spider 15 comprises vertically extending rods 17, on the upper ends of which the platter 14 is mounted, a main body 18, in which are fastened inverted bearings 19 which ride on the load pivots 16 of the lever 12, and a boss 18a in which is secured a stud 20. A check link pivot 21 is attached to the upper end of the stud 20, and a check link 22 is pivotally connected between the pivot 21 and a similar pivot 23 adjustably fastened on the upper end of a bracket 24 which extends upwardly from the base 10. The check link 22, and the pivots 21 and 23, in combination with the stud 20 and the bracket 24, form a checking parallelogram to maintain the condition of level of the platter 14 throughout its vertical movements.

A cone pivot 25 is mounted in the nose end of the main lever 12 (Fig. II) and rides in a stirrup 26, which forms the lower end of linkage 27, the upper end of which is pivotally connected to a load pivot 28 of a pendulum lever 29 extending transversely above the base 10. The lever 29 is pivoted in a vertical frame member 30, which is secured to the base 10, and has a pivot 31 located between its mounting in the member 30 and the load pivot 28. A stirrup 32, carrying a bearing 33 which is engaged with the pivot 31, is attached to the lower end of a metallic ribbon 34 which overlies the face of a power sector 35 to which the ribbon 34 is fastened. The sector 35 is a portion of a load counterbalancing pendulum 36 which, in addition, comprises two fulcrum sectors 37, a pendulum body 38 and pendulum weights 39 and 40. The pendulum 36 is supported by means of ribbons 41 which are fastened to the lower ends of the faces of the fulcrum sectors 37 and to the upper end of a sector guide bracket 42 which is mounted on the base 10.

Also attached to the lever 29 is a vertical rod 43 which is the plunger-rod of a motion damping dashpot 44 mounted on the base 10. The nose end of the lever 29 is connected, by means of a yoke 45, to the lower end of a rack-rod 46 which rod extends upwardly through the interior of a main housing 47 and into the interior of a cylindrically-shaped dial housing 48 which is mounted atop the housing 47. The upper end of the rack-rod 46 carries a rack 49 which is in mesh with a pinion 50 (see also Fig. III). The pinion 50 is secured on one end of a horizontal shaft 51 which is mounted in a bearing 52 carried by a vertical frame member 53, and in a bearing 54 attached to the vertical frame member 30. Also fixed on the shaft 51 are spiders 55 (Fig. VI) on the peripheries of which is carried a cylindrical chart 56.

A bezel 57 (Figures II and VI) is mounted on the outside of the cylindrical housing 48 on the merchant's side of the weighing scale and carries a lens 58 which serves to magnify weight indicia printed on the peripheral surface of the chart 56. A lamp 59 is mounted within the bezel 57 near its upper edge to illuminate the surface of the chart 56 so that the indicia thereon may be rendered more legible. A glass plate or semi-mirror 60 is mounted in a bracket 61, located in the interior of the bezel 57 at an angle of substantially forty-five degrees to the sight-line of the lens 58 which line is radial with respect to the chart 56. An inverted hook-shaped light carrier 62, which is constructed of material such as "Lucite," carries light rays from the lamp 59 around the corner of the bracket 61 and projects them upwardly through a slot 63 in the bracket 61, and through a slot 64 in a shield 65, mounted immediately below the bracket 61. A thin sheet of colored material is preferably located between the end of the "Lucite" light carrier and the slot 64. The light which is transmitted by the light carrier 62 is projected upwardly through the slot 64, which narrows it into a thin horizontal indicating line, and the slot 63 in the bracket 61 and is reflected from the exterior surface of the glass 60 to form a bright non-parallex index for the weight indicia which are viewed through the glass plate 60; both the index and the indicia being magnified by the lens 58.

A similar bezel 66 carries a lens 67 and is mounted on the opposite side of the housing 48 from the bezel 57 to afford an indication of the weight on the scale to customers. The bezel 66 houses equipment identical with that contained in the bezel 57 for illuminating and indexing weight indicia on the surface of the chart 56.

A cupola-like housing 68 surmounts the cylindrical-shaped housing 48 and has a vertical rectangular opening 69 on the merchant's side of the scale in which is located a window 70. The cupola-like housing 68 is mounted over an opening in the upper portion of the cylindrical housing 48. Two horizontally extending parallel rails 71 and 72 are mounted on the upper ends of the vertical frame members 30 and 53.

A traveling carriage 73 is mounted by means of rollers 74 which are carried by a bracket 75 attached to the rear lower portion of the carriage 73 (the left-hand side as viewed in Figure VI) and a roller 76 which is mounted in a bracket 77 attached to the lower front edge of the carriage 73. Fingers 78 extend downwardly from the bracket 75 underneath the edge of the rail 71, and a similar finger 79 extends beneath the edge of the rail 72. The fingers 78 and 79 do not engage the undersurface of the rails 71 and 72 respectively but serve to keep the carriage 73 from being derailed. The carriage 73 has an opening 80 in its front wall which is located immediately behind the opening 69 in the front wall of the cupola-like housing 68.

A lens frame 81, mounted in the carriage 73, supports horizontally disposed lenses 82 and 83 which are located near the bottom of the carriage 73. A mirror 84 is mounted in a frame 85 which is rockable on a horizontal axis parallel to the rails 71 and 72. The mirror 84 and frame 85 may be tilted to varying angles by means of an arm 86, which is attached to the frame 85 (Fig. VII) by means of a screw 87 which forms the axis of rotation of the frame 85. The arm 86 has a bifurcated end, between the forks of which there extends the cross arm of a horizontally disposed U shaped bar 88 (Figures III and VI) which is pivoted in the end walls of the housing 68. A knob 89 is attached to a stud 90 which extends outside of one end of the housing 68 and is attached to one of the arms of the U shaped bar 88. By rotating the knob 89, the bar 88 is swung on its axis against the action of a coil spring 88b (Fig. III) and in turn swings the arm 86 to rock the bracket 85 and the mirror 84. After the adjustment is made, the spring 88b returns the U bar 88 to the central position between the bifurcations of the arm 86 and out of contact therewith.

A lamp 91 (Figs. VII and VIII) is mounted just outside the main portion of the carriage 73 and is located behind a screen 92 which prevents any of its light from escaping through the opening 69 in the front of the housing 68. A light carrier 93 extends beneath the lenses 82 and 83 and out from under one end of the main portion of the carriage 73 into juxtaposition with the lamp 91.

The light carrier 93 is formed, preferably, of material such as "Lucite" to carry light from the lamp 91 beneath the lenses 82 and 83 and to focus such light into an aperture 94 in the light carrier 93. The aperture 94 is located on the focal axis of the lenses 82 and 83.

A transparent price-indicia-bearing plate 95 (Figs. VIII and XXIV) is horizontally disposed beneath and along the line of travel of the carriage 73 with a transparent area 96 centrally located with respect to the line of travel of the aperture 94 in the light carrier 93. The plate 95 is held in place by clips 97, which are attached to a screen 98 extending between the upper ends of the vertical frame members 30 and 53 and located between and approximately on the same horizontal plane as the rails 71 and 72. The screen 98, and the price-indicia-bearing plate 95 carried thereby, are located immediately above the periphery of the chart 56 and are positioned so that (see Figure XXIV) price indicia 99 on the plate 95 are on the same circumferential lines as the respective amount indicia 100 on the chart 56 which correspond thereto. The aperture 94 is of sufficient size so that it illuminates and delineates an area on the plate 95 and the chart 56 which includes the price indicia 99 and the amount indicia 100 corresponding to the value of the load on the scale at the selected price (such areas are outlined in Figure XXIV by broken lines and illustrated on a greatly enlarger scale in Figures XXV, XXVI and XXVII).

The lenses 82 and 83, being in proper focal relation to the amount indicia lying immediately beneath the bright illuminated transparent area 96, and to the price indicia 99 associated with such area, magnify the price indicia, and amount indicia and the mirror 84 reflects such magnified price indicia and amount indicia so that they may be viewed through the opening 80 in the carrage 73 and the opening 69 in the cupola-like housing 68. The indicia on the surface of the chart are inverted by the mirror 84 and appear to the merchant as shown in Figs. XXV, XXVI and XXVII. By turning the knob 89 and varying the angular position of the mirror 84, the line of sight along which the indicia are visible may be raised or lowered for persons of different stature.

A carriage return ribbon 101 (Figures III and VIII) is attached to the bracket 77 and extends horizontally through the lower portion of the housing 68 toward the left where it is wound on a spool 102 (Figure III) which spool is mounted on the upper end of a vertical shaft 103 journaled in bearings 104 and 105 supported by a portion of the vertical frame member 30. The spool 102 is securely attached to the shaft 103, to which there is also attached a hub 106 and a horizontally disposed gear 107 (Fig. V). A drum 108 surrounds the shaft 103 immediately below the gear 107, and a spiral spring 109 is fastened to the hub 106 and the drum 108. Rotation of the shaft 103, caused by movement of the carriage 73 toward the right (Fig. III), increases the tension of the spring 109 which tends to wind up the ribbon 101 on the spool 102 and return the carriage 73 toward the left side of the machine whenever possible. When released the speed of return of the carriage under the impetus of the spring 109, is controlled by means of a governor 110 mounted in a bracket 111 which is attached to the same portion of the vertical support member 30 as is the bearing 105. The governor 110 comprises a horizontally extending worm 112, which is in mesh with the gear 107 and rotatably mounted in the arms of the bracket 111. Attached to one end of the worm 112 are two governor arms 113. A thimble 114 surrounds the end of the worm 112 on which the arms 113 are attached and when centrifugal force becomes high enough to throw out the arms 113, their rubbing friction on the thimble 114 serves to control the speed with which the worm 112 can be rotated and thus the speed of the shaft 103 and the return of the carriage 73.

A carriage feed ribbon 115 (Figures III and VIII) is attached to the short arm of a bell crank 116 (see also Fig. IV) which is horizontally pivotally mounted on a bracket 117 attached to the carriage 73 near its lower right front corner. The long arm of the bell crank 116 straddlingly engages a deformable ribbon 118 which is mounted in clips 119 on the rail 72, substantially parallel to and extending along the rail 72. Slight manually made deformations of the ribbon 118 cause the bell crank 116 to swing slightly when it passes over such deformed portions since the pull of the carriage feed ribbon 115 is on the bell crank 116 rather than on the carriage 73 directly. As the bell crank is swung with relation to the carriage 73, the position assumed by the carriage 73 in response to a certain lineal movement of the carriage feed ribbon 115 will vary with the amount of swing of the bell crank 116 caused by deformation of the ribbon 118. Thus, if any error exists in the mechanism for moving the carriage 73, it may be compensated for by deforming the ribbon 118 to correctly position the carriage 73 for any desired set of price indicia and amount indicia corresponding thereto.

The opposite end of the carriage feed ribbon 115 is wound on a spool 120 (Fig. III) which is mounted on a vertically disposed shaft 121 journaled in bearings 122 carried in a subbracket 123 mounted on the upper end of the vertical frame member 53. A bevel gear 124 is pinned on the shaft 121 near its lower end.

A price-set-mechanism housing 125 (see also Figures I and II) is mounted on the right end of the cylindrical chart housing 48 by means of a slotted bracket 126 (Fig. I) fastened to a post 127 which extends out of the housing 48 and is attached at its inner end to a bracket 128 secured to a portion of the vertical frame member 53. A sleeve 129 is attached to the upper left-hand portion of the wall of the housing 125 by means of screws 130 which are radially spaced around an opening 131 in the sleeve 129. A bearing 132 is mounted in that end of the sleeve 129 furthest removed from the housing 125 and rotatably supports a horizontal shaft 133 which extends out of the housing 125 and on the outermost end of which is a bevel gear 134 in mesh with the gear 124. An annular V groove 135 is cut in the periphery of the sleeve 129 and cone point set screws 136 are threaded through the subbracket 123 and engage in the groove 135 to hold the sleeve 129, and the housing 125 attached to it, in position. An annular flange 137 is mounted around the sleeve 129 and covers the end of the bracket 123 which extends outside the end of the housing 48 when the housing 125 is attached thereto. The flange 137 is rotatable and has an opening 138 in its periphery to give access to the cone point set screws 136. Thus by loosening the set screws 136, and loosening a screw 139 which connects the housing 12 to the bracket 126, the entire price-set-mechanism housing can be rotated about the center line of the shaft 133 to properly mesh the gears 124 and 134 and can be removed from the scale as a complete unit.

The housing 125 consists of a main frame 140 (Figures IX and XII) which forms the front and left side of the housing, and a casing 141 which forms the back, right side and top and bottom of the housing. A face plate 142 has lips which overlie the joints between the main frame 140 and the casing 141 at the upper and right-hand front edges of the housing (as seen in Figures III and IX). Located in the lower part of the main frame 140 are two scoop-like openings 143 and 144. Two angle brackets 145 and 146 (Fig. IX) are an integral portion of the main frame 140 and extend backwardly from its front section on the right-hand side of the housing 125. A lower axle 147 is pinned in the bracket 145 and extends horizontally across the housing 125 between the bracket 145 and the left wall portion of the main frame 140 in which it is held (Fig. XII). An upper axle 148 is similarly mounted between the angle bracket 146 and the left wall section of the main frame 140 (Figures IX and XXIII).

A flanged wheel 149 is rotatably mounted on the axle 148 just inside the bracket 146. A similar flanged wheel 150 is similarly mounted on the axle 148 at its opposite end. A spiral spring 151 is attached to the hub of the wheel 149, by means of a screw 152, and is wound around the hub of the wheel 149 and has a looped end which is hooked over a stud 153, threaded through the bracket 146 near its junction with the front section of the main frame 140. A similar coil spring 154 is similarly mounted on the hub of the flanged wheel 150 and similarly held by a stud 155 which is threaded through the side wall section of the main frame 140. The flanged wheels 149 and 150 are thus rotatable on the axle 148 against the compression of the springs 151 and 154 and are adapted to be returned by such springs.

Somewhat similar flanged wheels 156 and 157 (Figures IX and XII) are rotatably mounted on the lower shaft 147 in the same vertical plane of rotation as are the wheels 149 and 150 respectively. Wide flexible ribbons 158 and 159 are each associated with a pair of upper and lower flanged wheels 149, 156 or 150, 157 respectively. The ribbon 158 is secured to the periphery of the wheel 149 by means of a screw 160 (Figures IX and XXII). The ribbon 158 is also secured to the flanged wheel 156 by means of a similar screw 161.

The front section of the main frame 140 has two vertical rectangular openings 162 and 163 (Fig. III) which are located immediately above the scoop-like openings 143 and 144 respectively. The ribbons 158 and 159 are located in the openings 162 and 163 respectively. The opening 162 (Fig. XI) has a flanged shoulder 164 and the face plate 142 (which has two rectangular slots overlying the openings 162 and 163) extends slightly over the edge of the flanged shoulder 164 to form a channel in which the flexible ribbon 158 slides when moving vertically.

A set of ten substantially L shaped finger holds 165 are riveted to the portion of the flexible ribbon 158 which extends along the opening 162. The finger holds 165 are numbered from zero to nine and correspond to the cents portion of the price indicia 99 located on the price-indicia-bearing plate 95. The ribbon 159 is secured to the flanged wheels 150 and 157 in the same manner that the ribbon 158 is secured to the wheels 149 and 156.

Similar substantially L shaped finger holds 166 are similarly fastened to the flexible ribbon 159, which is located in the vertical rectangular opening 163 above the scoop-like opening and moves through a channel, formed by that opening and the face plate 142, similar to that through which the ribbon 158 moves. The finger holds 166 represent the dimes value of the price indicia 99 carried by the price indicia plate 95.

Drive ribbons 167 and 168 (Figures XII and XIII) are secured to the pairs of wheels 149, 156 and 150, 157 respectively, by means of the screws 160 and 161 in the first instance, and similarly in the second instance, and pass behind the ends of horizontally disposed rods 169 (Fig. IX) which are secured in two pairs of ears 170 integral with the front section of the main frame 140 and located between the openings 162 and 163. Thus by pulling downwardly on the finger holds 165, the wheels 149 and 156 are rotated, in a counter-clockwise direction (Figures IX and XXII), against the tension of the spring 151 which spring, when the finger holds are released, returns the holds and the wheels to the position shown in Figure IX.

Pins 171 and 172 (Figures IX and XII) extend inwardly from one of the spokes of the flanged wheels 156 and 157 respectively. U shaped pawls 173 are rockably mounted, one on the inner end of each of the pins 171 and 172, and are urged downwardly by springs 174 against ratchet gears 175 which are rotatably mounted on the shaft 147 between the wheels 156 and 157. The rockable pawls 173 serve as ratchets to permit rotation of the flanged wheels 156 and 157 with relation to the ratchet gears 175 when the flanged wheels are being rotated in a counterclockwise direction by pressure pulling downwardly on the finger holds 165 and 166 respectively. However, when the flanged wheels are returning in a clockwise direction under impetus of the coiled springs 151 and 154 (which act on the flanged wheels 149 and 150 respectively and through the ribbons 158 and 159 on the flanged wheels 156 and 157 respectively) the ratchet gears are rotated also.

Two collars 176 are fixed to the shaft 147, one being located on one side of each of the ratchet gears 175, and are integral with substantially U shaped brackets 177 which extend transversely to the shaft 147. Each of the brackets 177 mounts a governor 178 which controls the speed of return of the flanged wheels and finger hold ribbons in the same manner that the governor 110 (already described) controls the return speed of the carriage 73. Each of the governors 178 comprises a worm 179 which is in mesh with the ratchet gear 175 and has two governor arms 180 which cooperate with a thimble 181 to control the maximum speed of rotation of the flanged wheels 156 and 157 when rotating in a clockwise direction.

The flanged wheel 149 (Fig. XXII), to which is fastened the flexible ribbon 158 which carries the cents finger holds 165, serves to set up the cents value of the price at which the commodity being weighed is sold. The wheel 149 is freely rotatable on the upper axle 148 (Fig. XXIII). Two actuating pins 182 and 183 are securely fastened in one of the spokes of the flanged wheel 149. The actuating pin 182 is engaged by a hooked end 184 of a rockable latch 185 which is pivoted on a stud 186 mounted in an ear 187 which is a portion of the front section of the main frame 140 (see also Figure X).

A drive ratchet wheel 188 (see also Fig. XXI) is mounted for free rotation on the upper axle 148, just inside the flanged wheel 149 and is urged in a clockwise direction by a spiral spring 189 which is secured to the hub of the drive ratchet wheel 188 and to one arm of a spring bracket 190 attached to the main frame 140. A drive pin 191 is mounted in, and extends through, the drive ratchet wheel 188 and is engaged by the actuating pin 183 which is mounted in the flanged wheel 149. A pawl 192 is rockably mounted on the stud 186, just inside the latch 185, and is urged toward engagement with the teeth of the drive ratchet wheel 188 by a spring 193 which is attached to one of its arms and to the upper one of the ears 170. A "hold-out" arm 194, which is a portion of the latch 185, extends across in front of the engaging arm of the pawl 192 and, when the mechanism is in the position shown in Figures IX and XXII, the pawl 192 is held out of engagement with the drive ratchet wheel 188.

A selecting ratchet wheel 195 (Figures X, XX, XXII and XXIII) is also rotatably mounted on the upper axle 148, just inside the drive ratchet wheel 188, and is similarly urged in a clockwise direction (Figures XX and XXII) by means of a spiral spring 196 fastened to its hub and to the bracket 190. A drive pin 197, which is similar to the pin 191 of the ratchet wheel 188, is mounted in the selecting ratchet wheel 195 and is engaged by the drive pin 191. A lower foot 198 of the latch 185 is engageable with the ratchet teeth of the selecting ratchet wheel 195 and is in engagement with such teeth when the mechanism is in the zero position illustrated in the drawings.

A locking ratchet wheel 199 (Fig. XIX) is similarly mounted on the upper axle 148 and has a coil spring 200 fastened to its hub and to the bracket 190. A drive pin 201, secured in the locking ratchet wheel 199, is engaged by the drive pin 197 of the selecting ratchet wheel 195. A pawl 202, which also is pivoted on the stud 186, is urged toward engagement with the ratchet teeth of the locking ratchet wheel 199 by means of a spring 202b (Fig. XIX) being held out of engagement with such teeth by the "hold-out" arm 194 of the latch 185 when the mechanism is in the position illustrated. A pinion 203 is integral with the hub of the locking ratchet wheel 199 and extends concentrically with the shaft 148 from that side of the locking ratchet wheel 199 opposite the ratchet wheels 188 and 195.

A positioning arm 204, which is a portion of the latch 185 (Figures XXII and XXIII), is engageable with the bottom side of the ear 187. The ear 187 is partly split and the two portions are adjustable relative to each other by means of a screw 205 which extends through the adjustable portion and is threaded into the main portion. Rotation of the screw 205 changes the position of the adjustable portion of the ear 187 and thus the rest position of the latch 185 because of the engagement of the positioning arm 204 with the ear 187.

A main driving gear 206 (Figures X, XVII, XVIII and XXIII) is rotatably mounted on the upper axle 148 and is in engagement with a pinion 207 which is located near the innermost end of the shaft 133 leading into the price weight mechanism from the weighing scale and indication mechanism. The innermost end of the shaft 133 is supported by a bearing 208 (Figure IX) located in an ear 209 of the main frame 140.

The pinion 203 of the locking ratchet wheel 199 is in mesh with a gear 210 which is mounted on a countershaft 211 journaled in the driving gear 206 and in an outrigger 212 which is attached to, and supported by, the driving gear 206. A pinion 213 is integral with the gear 210 and located between it and the driving gear 206. The pinion 213 is in mesh with the gear 214, which is located on the same side of the driving gear as the pinion 213, and is secured to a second countershaft 215. The countershaft 215 is journaled in the outrigger 212, passes freely through the driving gear 206 and has its opposite end journaled in a similar outrigger 216 located on the opposite side of the driving gear 206 from the outrigger 212. A pinion 217 is secured to the countershaft 215 on the opposite side of the driving gear 206 from the gear 214. The pinion 217 is engaged by a gear 218 which is integral with a locking ratchet wheel 199a (Fig. XVI), which is rotatable on the axle 148, and is identical to the locking ratchet wheel 199 (already described) except that it is in reverse position and does not have a spiral spring attached to its hub.

The mechanism illustrated in Figures XIII, XIV, XV and XVI comprises the driving, selecting, and locking ratchet wheel and pawl mechanism for the dimes or tens figures of the prices at which merchandise weighed on the scale can be sold. The mechanism is, in all respects except that already noted (the difference between the locking ratchet wheels 199 and 199a in that the wheel 199a does not have a spiral spring), identical with the mechanism illustrated in Figures XIX, XX, XXI and XXII and, therefore, will not be described in complete detail. The mechanism illustrated in these figures is shown in one of its operating positions immediately after a value amount has been set up in the mechanism and before the finger holds 166 have been released whereas the mechanism illustrated in Figures XIX, XX, XXI and XXII is shown at the rest position with no amount set up in the mechanism.

The gear train illustrated primarily in Figures XVII and XVIII forms a differential gearing mechanism with a driving ratio of ten to one between the gear 218 attached to the locking ratchet wheel 199a and the pinion 203 integral with the locking ratchet wheel 199. This is to provide for the ten to one ratio between the cents and the dimes values set up by the finger holds 165 and 166 respectively. Further description of this mechanism, and its operation, will be given under the description of the operation of the price-set mechanism as a whole.

*Operation*

With reference to Figure XXIV, the amount indicia borne by the chart 56 for each price range form a peripheral column of figures on the surface of the chart 56 and such columns are spaced equal horizontal distances from each other longitudinally on the chart 56. Therefore to move the carriage 73 (Fig. III) from one price to a price one cent higher requires that the carriage feed ribbon 115 be moved a certain distance. This means that the gearing involved and the shaft 133 must be rotated a fixed amount to move the carriage 73 from one price column to the next. This amount of movement is fixed for each advance of one cent in price. Similarly, the distance between, for example, the amount indicia for a price of ten cents and a price of twenty cents is equal to the horizontal distance between the amount indicia for the price twenty cents and the price thirty cents and is ten times the distance between prices only one cent apart. The finger holds 165 of the cents mechanism are each spaced sufficiently far apart so that the additional distance that each successively higher numbered finger hold will drive the mechanism, when it is brought down to the stop formed by the scoop-like opening 143, is transformed into sufficient movement of the carriage 73 to move it from one column of amount indicia to the next.

Movement of the finger holds 165 downwardly (Figures IX and XXII) rotates the flanged wheel 149 and the actuating pins 182 and 183 attached thereto. When the actuating pin 182 is moved downwardly, it cams against the inner surface of the hooked end 184 of the latch 185 and rotates the latch 185 in a clockwise direction far enough to remove the foot 198 from in back of that tooth on the selecting ratchet wheel 195 in which the foot 198 is engaged at the position illustrated in Figure XXII. At the same time the "hold-out" arm 194 is removed from in front of the pawls 192 and 202 and their engaging ends engage the teeth of the drive ratchet wheel 188 and locking ratchet wheel 199 respectively. The driving pin 183 on the flanged wheel 149, being engaged with the pin 191 of the driving ratchet wheel 188 and that pin being in turn engaged with the pin 197 of the selecting ratchet wheel 195 which is in turn engaged with the pin 201 of the wheel 199, rotation of the flanged wheel 149 in a counterclockwise direction also rotates the ratchet wheels 188, 195 and 199 in a counterclockwise direction the same distance as the flanged wheel is rotated. This distance is determined by that one of the finger holds which is selected to move the mechanism and is progressively greater as higher numbered finger holds are selected since that finger hold selected is moved downwardly until the operator's finger contacts the scoop-like opening 143. During this rotative movement of the ratchet wheels the pawls 192 and 202 slide successively over the ratchet teeth of the wheels. When the bottom limit of the stroke has been reached (as shown in Figures XIII, XIV, XV and XVI), the pawls 192 and 202 are engaged back of the last one of the teeth on the ratchet wheels to have been moved past the engaging arms of these pawls. The finger hold is now released and the action of the spiral spring 151 returns the flanged wheel 149 to the position shown in Figures IX and XXII leaving the ratchet wheels in their advanced position with all of them being held there by the pawl 192 and the engagement of the pins 191, 197, 201. Just before the flanged wheel 149 reaches the position shown in Figure XXII, the actuating pin 182 cams against the opposite side of the hooked end 184 of the latch 185 and swings it in a counterclockwise direction. This moves the foot 198 in behind one of the teeth in the selecting ratchet wheel 195 and the "hold-out" arm 194 disengages the pawls 192 and 202 from the ratchet wheels 188 and 199 respectively. This frees the driving ratchet wheel 188 which, under impetus of the spiral spring 189, returns to its starting position being stopped by return engagement of the drive pin 191 with the actuating pin 183; however, the engagement of the foot 198 of the selecting ratchet wheel 195, holds that ratchet wheel at its advanced position and the pin 197 of that ratchet wheel being engaged with the pin 201 of the locking ratchet wheel 199, that ratchet wheel, too, is held at its advanced position.

The rotation of the locking ratchet wheel 199 to its advanced position has rotated the pinion 203. The ratio between this pinion and the differential gear train, of which it is a part, is such that the rotation of the pinion 217 tends to rotate the gear 218 in a direction opposite to the rotation of the pinion 203. This rotation of the gear 218 in this opposite direction (the relative directions of gear rotation are indicated by arrows in Figures XVI, XVII, XVIII and XIX) is prevented by the engagement of the pins 201a, 197a, 191a and the actuating pin 183a and the engagement between the actuating pin 182a and the hooked end 184a of the latch 185a. Therefore, since the pinion 217 cannot rotate the gear 218 it is revolved around the gear 218 and in so revolving rotates the driving gear 206 in the direction shown by the arrows in Figures XVII and XVIII which rotates the pinion 207 and rotates the shaft 133 and through the bevel gears 124 and 134, the shaft 121 to wind the carriage feed ribbon 115 on the spool 120 and move the carriage 73 a corresponding distance to the right (Fig. III).

When the next price is to be set up in the cents mechanism (disregarding for the time being prices above nine cents), the finger hold 165 corresponding to that price is moved downwardly. The resulting rotation of the flanged wheel 149 cams the foot 198 of the latch 185 out from behind the tooth of the selecting ratchet wheel 195, with which it has been engaged, and the spring 196 immediately returns that ratchet wheel until the pin 197 engages the pin 191 in the driving ratchet wheel 188. However, this camming action has also removed the "hold-out" arm 194 and has permitted the pawls 192 and 202 to engage the drive ratchet wheel 188 and the locking ratchet wheel 199. The drive ratchet wheel 188 is being rotated forward and therefore the pawl 192 merely slides over its ratchet teeth. But, since the locking ratchet wheel 199 is still at the position of the price previously set up, the driving pin 197 of the selecting ratchet wheel 195 is some distance away from the pin 201. The locking edge of the pawl 202 holds the locking ratchet wheel at its formerly taken advanced position, and, since this wheel carries the pinion 203, the differential gearing and therefore the carriage 73 do not change position when the new price is started to be set up.

If the second price to be set up is larger than the first price set up, the driving pin 197 of the selecting ratchet wheel 195 will be finally brought into contact with the pin 201 of the locking ratchet wheel 199 and that latter wheel will be moved on to the new price along with the ratchet wheels 188 and 195. In this event, release of the finger hold will result in operations in the mechanism as already described. However, if the new price is less than the first price set up, the driving pin 197 of the selecting ratchet wheel 195 will never reach engagement with the pin 201 of the ratchet wheel 199 but will stop a distance short of it proportional to the difference between the larger first price and the smaller price now being set up. Then upon return of the flanged wheel 149 to its rest position, the subsequent camming operation of the latch 185, the foot 198 of this latch will be moved in behind one of the teeth in the selecting ratchet wheel 195 which will hold that wheel at the correct position for the second smaller price which it is desired to set up. The relation between the position of the "hold-out" arm 194 and the foot 198 of the latch 185 is such that the foot 198 will be engaged with the selecting ratchet wheel 195 before the "hold-out" arm 194 disengages the pawl 202 from the teeth of the locking ratchet wheel 199. Therefore, when this pawl 202 is disengaged from the locking ratchet wheel 199, and the wheel returned under the impetus of the coil spring 200, it will return only until the pin 201 engages the pin 197 of the selecting ratchet wheel 195 which will rotate the pinion 203 and cause the differential gear mechanism to rotate the shaft 133 and permit the carriage 73 to be moved toward the left (Figure III), and the smaller price, under the tension of the carriage return ribbon 101. This delayed release of the locking ratchet wheel 199 assures that, whether the second price set up is larger or smaller than the first price, the carriage 73 will always move directly from the first price position to the second price position without returning to zero.

The operation of the dimes or tens amount selecting mechanism is identical with the operation already described of the cents value mechanism. Three ratchet wheels 188a, 195a and 199a are mounted on the axle 148 and have associated with them two pawls 192a and 202a and a latch 185a. The interrelation of the latches and pawl, and their operation on the ratchet wheels in so far as setting up, locking and selecting is concerned, is similar to that already described for the cents wheel. The primary difference between the two mechanisms is the fact that the pinion 218, which is integral with the locking ratchet wheel 199a, has a ratio with respect to the differential gearing which results in driving the driving gear 206 a distance ten times as great for each successive movement of the flanged wheel 150, resulting from use of successive ones of the dimes finger holds 166 as the distance resulting from similar movement of the flanged wheel 149 of the cents mechanism. In the case of the dimes mechanism, the gear 210 is driven as a result of the rotation of the gears in the differential gear train and the pinion 203, being integral with the locking ratchet wheel 199 of the cents selecting mechanism and this ratchet wheel being held either at zero, by the contact of the various driving pins with the actuating pins, or at a selected cents value, by the retaining action of the pawl 202 in the teeth of the ratchet wheel 209, the pinion 203 cannot rotate and therefore the gear 210 must revolve about it and rotate the driving gear 206 with it. The gear 210, being of much larger size than the pinion 203 about which it revolves, moves the driving gear 206 a further distance for each unit of movement of the dimes selecting mechanism than the small pinion 217 moved the driving gear 206 for each unit of movement of the cents mechanism. As mentioned, the ratio between these movements is ten to one to take care of the difference between the dimes and cents values.

It has been mentioned that there is no spiral spring around the locking ratchet wheel 199a to return it to zero or to the second selected price position. This is because such a spring is not needed in the dimes mechanism since the tension maintained on the carriage return ribbon 101 (Figure III) is sufficient not only to move the carriage 73 to a lower dimes value but also to turn the mechanism and the differential gearing which will return the locking ratchet wheel 199a toward zero or until its driving pin 201a engages the driving pin 197a.

If we now assume that a price above nine cents, but not in even dimes, is desired to be set up in the mechanism, both of the selecting mechanisms may be operated either in unison or in sequence and with either the cents or the dimes mechanism being operated first. If the mechanisms are operated in sequence, the back pressure on one mechanism, which is necessary to cause the differential gear train to rotate the driving gear, is maintained by the engagement of the latch 185 or 185a with the actuating pin 182 or 182a when the mechanism not being moved is at zero. When the second selection is made, the back pressure is maintained by the locking of the locking ratchet wheel by the pawl 202 or 202a.

If both selecting mechanisms are operated simultaneously, the back pressure for each is furnished by the other, which is being moved forward at the same time, and the net result is a cumulative movement of the driving gear 206 and thus the carriage 73.

The fact that the back pressure necessary for operating one of the selecting mechanisms through the differential gear is provided by the other selecting mechanism either at its zero position or at an advanced price selecting position, makes the operation of either mechanism possible regardless of the position of the other mechanism. For example, if the carriage 73 were located over the price "27," and it were desirable to move the carriage to the price "17," it is only necessary to operate the dimes selecting mechanism by setting up the figure 1 which will release the locking ratchet wheel 199a and permit it to move back one step but will in no way interfere with the position of the cents mechanism which will maintain its position relative to that of the dimes mechanism. Similarly, a change in price, for example from thirty-two to thirty-seven cents, can be made by merely moving the "7" finger hold 165 downwardly until the opening 143 is struck which will drive the locking ratchet wheel 199 the necessary additional distance and will revolve the differential gearing and move the carriage 73 to the correct price.

Indication

Referring now to Figures XXIV, XXV and XXVI, the aperture 94 in the viewing mechanism, located in the carriage 73, is indicated by dotted lines in Figure XXIV, being shown in three different positions for the prices twelve cents, seventeen cents and twenty-two cents. The chart 56 and amount indicia 100 are shown in the position they would assume under a load of two and one-quarter pounds. The transparent area 96 in the price-indicia-bearing plate 95 has stepped edges and two strips 219 of contrasting colored semitransparent material which outline the transparent area on both sides and grow progressively wider, thus narrowing the transparent area as the prices get higher and higher. The reason for this narrowing of the transparent area is as follows: On, for example, a twenty-four pound capacity scale, the number of amount indicia 100 which must be carried for a price of five cents is only 120. On the other hand, the number of indicia which must be carried to give one cent indications for twenty-five cents per pound is 600. Similarly, for greater prices the number of indicia becomes progressively higher. Since the chart is cylindrical in shape and will rotate an equal distance for an equal weight, the amount of indicia 100 are spread apart much further on the periphery of the chart for the smaller prices than for the larger prices. The use of the narrowing transparent viewing area permits the elimination of graduation lines on the chart and of a viewing line located near the chart's periphery. The width of the transparent opening 96 over each peripheral row of amount indicia corresponds to the distance on the periphery of the chart representing one cent's worth of material weighed at the associated price per pound. Thus, if only one figure is visible in the transparent area 96, the value of the merchandise upon the scale at the price shown by the price indicia 99 (only one price indicia being visible at a time in the carriage 73) is that amount to the nearest half cent.

Referring to Figure XXV, which represents the indicia visible in the carriage 73 when a price of twelve cents has been set up and a load of two and one-quarter pounds is on the scale, the figure 27 is in the center of the transparent area 96 because the product of twelve cents by two and one-quarter pounds is an even figure.

In Figure XXVI, the price shown is seventeen cents which multiplied by two and one-quarter pounds gives a total amount of thirty-eight and one-quarter cents. In Figure XXVI, the figure "38" is alone in the transparent area 96, and thus indicates, although it is near the limit of the transparent area 96, that the correct amount to the nearest half cent is "38" cents.

In Figure XXVII, with a price of twenty-two cents per pound the actual total amount is forty-nine and one-half cents. The two figures "49" and "50" are each half in and half out of the transparent area 96, the other half of each figure being in the semitransparent colored area 219. This equal extension into the transparent area 96 occurs only in the even half cents and, depending upon the policy of the store, the scale operator would charge whichever figure such policy dictates. However, this indeterminate amount occurs only very rarely and any slightly greater extension of one figure over the extension of the other figure into the transparent area is a clear indication that the figure extending furthest represents the amount to be charged.

Figure XXIV shows a fragment of the chart and price-indicia-bearing plate as they would appear from the merchant's side of the scale. The figures are inverted when viewed from this side and, by means of the mirror 84 are turned upright.

Modified viewing apparatus

Figures XXVIII to XXXIII inclusive illustrate a modification of the movable carriage to give an indication of the amount not only to the merchant but also to the customer. A carriage 73a is mounted to move horizontally on rails 71a and 72a, the latter of which carries a deformable ribbon 118a which is mounted thereon in clips 119a. The carriage 73a contains a pair of lenses 82a and 83a which are supported over the price-indicia-bearing plate 95 and the transparent area 96 therein.

A glass plate or semimirror 220 is supported in a frame 85a which is rockable on a horizontal axis by means of an arm 86a attached to the frame 85a. A bar 88a extends longitudinally along the path of travel of the carriage 73a and is pivoted in the end walls of a cupola-like housing 68a supported on a cylindrical chart housing 48. A knob 89a is connected to the arms of the bar 88a to swing it, and thus the arm 86a, to rock the glass 220 and vary its angle with relation to the focal axis of the lenses 82a and 83a.

A lamp 91a is located within the carriage 73a near the bottom of its housing and a light carrier 93a transmits light from the lamp to an opening 94a in the light carrier 93a and thence on to the surface of the chart 56. An opening 80a in the front wall of the carriage 73a is in line with an opening 69a in the wall of the cupola-like housing 68a. The indicia on the price-indicia-bearing plate 95 are magnified by the lenses 82a and 83a and inverted and reflected by the mirror 220 through the openings 80a and 69a where they can be viewed by the merchant. The carriage 73a is connected to a carriage return ribbon 101a and a carriage feed ribbon 115a in an identical manner to the way that the carriage 73 is connected, the carriage feed ribbon 115a operating through a bell crank 116a engaged on the deformable ribbon 118a.

A transversely inclined mirror 221 (Fig. XXIX) is located in the upper wedge-shaped portion of the housing of the carriage 73a, and a second similarly inclined mirror 222 is located at the opposite end of the carriage 73a from the mirror 221. Light rays from the indicia on the chart 56, which are magnified by the lenses 82a and 83a, are reflected by the glass plate 220 and also pass through it, striking the mirror 221 which reflects them onto the mirror 222 which reflects them downwardly onto another mirror 223 which is mounted in a frame 224 rockable on a horizontal axis by means of an arm 225 and a longitudinally extending arm 226 which is pivoted in the end walls of the cupola-like housing 68a by means of a knob (not shown) extending outside the end of the housing 68a. The mirror 223 reflects the indicia through an opening 227 in the wall of the carriage 73a opposite from the opening 80a and then through a windowed opening 228 on the customer's side of the cupola-like housing 68a. The mirrors 221, 222 and 223, reflect the indicia on the chart which, from the customer's side of the scale, are reversed and turn them sideways to properly exhibit them to the customer.

In this modification of the viewing mechanism, both the merchant and the customer see the same price and amount indication and the line of sight for each indication may be independently varied to accommodate people of different heights or to compensate for different levels of the weighing scale.

The embodiments of the invention that have been disclosed may be modified to meet various requirements.

Having described the invention, we claim:

1. In a weighing scale, in combination, a chart and a price-indicia-bearing member movable relatively to each other by loads on said scale, said chart bearing rows of computed amount indicia corresponding to such price indicia associated therewith, single price and amount indicating means and unit price selecting mechanism comprising individual selectors for dime and cents and means for combining motion of the selectors in proportion to their relative values for moving said means relative to said member and said chart and for positioning said means in viewing relation to that one of such prices selected in said mechanism, and such corresponding amount indicia.

2. In a weighing scale, in combination, a chart and a price-indicia-bearing member movable relatively to each other under the influence of loads on said scale, said chart bearing rows of amount indicia associated with such price indicia borne by said member, single price and amount viewing means and price selecting mechanism comprising a plurality of groups of movable finger holds one group for each digit in the price, and means for combining the movement of the groups of finger holds in proportion to the represented value and for translating the movement of said holds directly into movement of said viewing means of sufficient amplitude to position said viewing means in viewing relation to that price indicium and associated amount indicium on said member and said chart corresponding to a selected price.

3. In a weighing scale, in combination, a chart bearing rows of amount indicia, a price-indicia-bearing member associated therewith, single price and associated amount viewing means and a price selecting mechanism for moving said viewing means into viewing relation to that one of such price indicia on said member and the amount indicia on said chart associated therewith, corresponding to the price selected in said mechanism, said mechanism including means for selecting digits and means for selecting tens, said digit selecting means being geared relative to said tens selecting means to position said viewing means relative to the position to which it is moved by said tens selecting means.

4. In a weighing scale, in combination, a chart bearing rows of amount indicia, a price-indicia-bearing member associated therewith, a carriage movable along said price-indicia-bearing member for exhibiting one of such prices and the amount indicia associated therewith, at a time, a price selecting mechanism for moving and positioning said carriage, said price selecting mechanism being mechanically connected to said carriage and having means for moving said carriage to positions corresponding to tens portions of such prices, other means for moving said carriage to positions corresponding to units portions of such prices and means for co-ordinating the movement of both of said means for moving said carriage.

5. In a computing weighing scale having a one-price indicating member movable with respect to a chart bearing rows of amount indicia and a member bearing price indicia corresponding to such rows of amount indicia, in combination, a price selecting mechanism including means operatively connected to such one-price indicating member for moving such one-price indicating member, mechanism movable through successively larger distances corresponding to successively larger tens values of prices being selected, means for translating such movement of said mechanism to movement of said means for moving such one-price indicating member, other mechanism movable through successively larger distances corresponding to successively larger units of values of prices being selected, and differential means for translating such movement of the last mentioned mechanism to proportionate movement of the first mentioned mechanism.

6. In a computing weighing scale, in combination, a chart having peripheral rows of computed amount indicia, a price-indicia-bearing member associated therewith, price selecting mechanism, one-price indicating means movable by said mechanism to position to indicate a selected price on said price-indicia-bearing member and the amount indicia associated therewith on said chart, a deformable member adjacent the path of movement of said one-price indicating means and means for moving said one-price indicating means including connections with said price selecting mechanism and a lever pivotally mounted on said one-price indicating means, one arm of said lever being a portion of the connections between said price selecting mechanism and said one-price indicating means and the other arm of said lever straddlingly engaging said deformable member.

7. In a computing scale, in combination, a chart bearing peripheral rows of amount indicia and a unit price-indicia-bearing member associated therewith, means for exhibiting a single unit price indicium and the amount indicia corresponding thereto for the load being weighed on said scale, a price selecting device for moving said means into exhibiting relationship with a selected price and amount, said price selecting device including dimes amount selecting mechanism and cents amount selecting mechanism and integrating mechanism moved by said dimes selecting mechanism, said cents selecting mechanism also moving said integrating mechanism relative to the positions into which said integrating mechanism is moved by said dimes mechanism, and means connecting said integrating mechanism to said means for exhibiting a single unit price and associated amount.

8. In a computing scale, in combination, a single price and amount indicator and mechanism for selecting such price including finger holds representing successively larger dimes values of prices to be selected, said finger holds being movable through respectively larger distances corresponding to such larger dimes values, said finger holds being mounted on a flexible drive means engaged with mechanism for moving said price and amount indicator, similar finger holds representing cents values and differential means for converting movement of said dimes finger holds and of said cents finger holds into proportionate movement of said price and amount indicator.

9. A price selecting device for a single price exhibiting computing scale having a movable price exhibitor, comprising, in combination, dimes selecting mechanism including manually operable flexible means movable through successively greater distances for successively larger dimes amounts, a wheel on which said flexible means are engaged, a drive ratchet wheel rotatable with said wheel, a selecting ratchet wheel rotatable with said drive ratchet wheel and a locking ratchet wheel rotatable with said selecting ratchet wheel, said ratchet wheels being interlocked and rotated forwardly in unison by the selecting movement of said flexible means, said drive ratchet wheel returning to zero position upon return of said flexible means to zero position, said selecting ratchet wheel and said locking ratchet wheel remaining at the selected position, said selecting ratchet wheel returning toward engagement with said drive ratchet wheel immediately at the start of a second price selection, said locking ratchet wheel remaining at the previously selected position, said locking ratchet wheel moving to the second selected position if corresponding to a larger price than the first selected position in unison with said selecting ratchet wheel, and, if a smaller price, returning thereto upon return of said flexible means and said drive ratchet wheel to zero, cents selecting mechanism substantially identical with said dimes selecting mechanism and differential means interconnecting said dimes selecting means and said cents selecting means to move said price exhibitor proportionate distances.

10. In a computing scale, in combination, means for exhibiting a selected unit price and the amount associated therewith corresponding to the value of the load on said scale at such unit price, and price selecting mechanism for moving said exhibiting means to the proper position to exhibit such price and amount, said mechanism comprising flexible means movable through successively larger distances corresponding to successively greater dimes values of prices being selected, gearing moved by said flexible means to positions corresponding to prices being selected, means for retaining said gearing in the position corresponding to the first price selected during a subsequent selection, means for moving said gearing from the first position so selected directly to the subsequent position and means for translating such movement and positioning of said gearing into movement and positioning of said exhibiting means.

11. In a price selecting device for a one-price computing scale, in combination, a carriage movable relative to unit price and computed amount indicia borne by such scale for displaying only a selected one of such unit price and amount indicia at a time, selectively positionable driving mechanism for moving said carriage and positioning said carriage in displaying relation to such selected price, a member movable through successively greater distances corresponding to successively larger tens values of unit prices, gearing connecting said member to said mechanism, said gearing including means for holding said mechanism in a position corresponding to a selected price during the selection of a subsequent price and means for moving said gearing directly from the first mentioned position to the position corresponding to such subsequently selected price.

12. In a weighing scale, in combination, a chart and a price-indicia-bearing member movable relatively to each other by loads on said scale, said chart bearing rows of computed amount indicia corresponding to such price indicia associated therewith, single price and amount indicating means, said means comprising a magnifying lens to produce an enlarged virtual image, a stationary semitransparent mirror to divide the light and a reflecting system to simultaneously exhibit the same single price indicium and amount indicia associated therewith to the merchant operating said scale and to persons on the opposite side of said scale, and unit price selecting mechanism for moving said means relative to said member and said chart and for positioning said means in viewing relation to that price indicium corresponding to that unit price selected in said mechanism and to the amount indicia associated with such price indicium.

13. In a weighing scale, in combination, a chart and a price-indicia-bearing member movable relatively to each other under the influence of loads on said scale, said chart bearing rows of amount indicia associated with such price indicia borne by said member, a single price and associated amount viewing device comprising means for exhibiting a selected price and the associated amount indicia to the merchant operating said scale and a stationary semitransparent mirror and reflecting mirrors for exhibiting the same indicia to customers on the opposite side of said scale and mechanism for selecting such price and moving said viewing device into exhibiting relation therewith.

14. In a weighing scale, in combination, a chart having peripheral rows of amount indicia, a price-indicia-bearing member bearing price indicia corresponding to the amount indicia on said chart, a viewing device movable relative to said price-indicia-bearing member and said chart, said viewing device having means for exhibiting a single one of the price indicia borne by said price-indicia bearing member and the amount indicia on said chart associated therewith, a semitransparent mirror for reflecting such indicia toward the merchant's side of said scale and a series of mirrors for reflecting said indicia toward the customer's side of said scale, and means for selectively positioning said device in exhibiting relation to a selected one of said price indicia and amount indicia associated therewith.

15. In a computing weighing scale, in combination, a chart movable in response to loads on said scale bearing computed amount indicia arranged in peripheral rows, a price-indicia-bearing member associated therewith, means for exhibiting a selected one of such price indicia and the amount indicia associated therewith, said means comprising a mirror arranged to reflect such indicia to one side of said scale and mirrors arranged to reflect the same indicia to the other side of said scale, the numerals comprising such indicia being so arranged that said mirrors in said means reflect such indicia in an upright not-reversed position on both sides of said scale, and mechanism for positioning said means in exhibiting relation to such selected one of such price indicia and amount indicia associated therewith.

16. In a computing weighing scale, in combination, a chart responsive to loads weighed on said scale and bearing peripheral rows of computed amount indicia, a price-indicia-bearing member associated with said chart, said price-indicia-bearing member extending along said chart with its major axis and rows of price indicia parallel to the axis of said chart, a one-price and amount exhibiting device containing means for exhibiting a selected one of such price indicia and the amount indicia associated therewith, and mechanism for positioning said device in exhibiting relation to such selected price, said price indicia bearing member having a longitudinally extending transparent section, translucent material forming the edges of such transparent section, the width of such transparent section being substantially equal to the peripheral distance between successive indicia of a peripheral row of computed amount indicia corresponding to a price indicium located adjacent the portion of such transparent section having such width, such transparent section being progressively narrower adjacent successively higher price indicia, the ratio between the width of said section and the peripheral distance between indicia in the successively higher computed amount indicia rows remaining substantially the same.

17. In a computing scale, in combination, a viewing device for exhibiting a single unit price and computed amount and manually motivated mechanism for positioning said device in viewing relation to such price and amount, said mechanism comprising members movable through distances corresponding to and proportionate to the digits of selected prices, and means for combining the movements of said members in proportion to their relative monetary value and for converting such movement into movement of said viewing device.

CHARLES O. MARSHALL.
LAWRENCE S. WILLIAMS.